United States Patent
Pobbati et al.

(10) Patent No.: US 10,443,510 B2
(45) Date of Patent: Oct. 15, 2019

(54) MODEL BASED BUMP-LESS TRANSFER BETWEEN PASSIVE AND ACTIVE MODE OPERATION OF THREE-WAY CHECK VALVE FOR LIQUID FUEL DELIVERY IN GAS TURBINE SYSTEMS

(71) Applicant: General Electric Company, Schenectady, NY (US)

(72) Inventors: Omprakash Pobbati, Hyderabad (IN); Sunil Unnikrishnan, Hyderabad (IN); Pradeep Kumar Vavilala, Hyderabad (IN); James Frederick Den Outer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 15/210,382

(22) Filed: Jul. 14, 2016

(65) Prior Publication Data
US 2018/0016991 A1    Jan. 18, 2018

(51) Int. Cl.
*F02C 9/26* (2006.01)
*F02C 9/32* (2006.01)
(Continued)

(52) U.S. Cl.
CPC ............ *F02C 9/32* (2013.01); *F02C 7/232* (2013.01); *F02C 9/263* (2013.01); *F02C 9/40* (2013.01);
(Continued)

(58) Field of Classification Search
CPC .... F02C 9/26; F02C 9/263; F02C 9/28; F02C 9/32; F02C 9/40; F02C 9/48; F02C 7/22;
(Continued)

(56) References Cited

U.S. PATENT DOCUMENTS 5,252,860 A * 10/1993 McCarty .................. F02C 9/28
290/40 R
6,145,294 A * 11/2000 Traver ..................... F23K 5/18
60/39.094
(Continued)

FOREIGN PATENT DOCUMENTS

EP    1 916 482    4/2008

OTHER PUBLICATIONS

Salsbury Ph.D., T.I., et al., Fault Detection in HVAC Systems Using Model-based Feedforward Control; Johnson Controls Inc., 1998.*
(Continued)

*Primary Examiner* — William H Rodriguez
*Assistant Examiner* — Alyson Joan Harrington
(74) *Attorney, Agent, or Firm* — Frank A. Landgraff; Hoffman Warnick LLC

(57) ABSTRACT

A method using an inverse three-way valve model with feed-forward fuel flow control is provided for controlling liquid fuel flow in a turbine power generation system to achieve a bump-less driven watts (dwatt) power output during fuel mode transitions between passive mode and active mode operations of a three-way check valve that delivers liquid fuel to the turbine combustor nozzles. The method utilizes an inverse fluid flow model for a three-way check valve which is based upon a valve position surrogate for the three-way check valve to develop a calculated estimate of a fuel spike/dwatt oscillation likely to occur during mode transitions of the three-way check valve and to produce a feed-forward control used to modulate a fuel path bypass valve within the turbine fuel supply circulation system that provides the liquid fuel to the three-way valve during transfers of valve operation between passive and active mode operations.

14 Claims, 5 Drawing Sheets

(51) Int. Cl.
*F02C 7/232* (2006.01)
*F02C 9/40* (2006.01)

(52) U.S. Cl.
CPC ...... *F05D 2270/44* (2013.01); *F05D 2270/71* (2013.01)

(58) Field of Classification Search
CPC .. F02C 7/232; F05D 2270/301; G05B 13/042
See application file for complete search history.

(56) References Cited

U.S. PATENT DOCUMENTS

| | | | |
|---|---|---|---|
| 6,438,963 B1* | 8/2002 | Traver | F23K 5/147 60/39.094 |
| 6,932,052 B1 | 8/2005 | Fulton | |
| 7,077,103 B2 | 7/2006 | Henn et al. | |
| 7,481,039 B2 | 1/2009 | Sumilla et al. | |
| 7,509,932 B2 | 3/2009 | Hara et al. | |
| 7,730,711 B2 | 6/2010 | Kunkle et al. | |
| 7,949,458 B2 | 5/2011 | Yasui et al. | |
| 7,950,238 B2 | 5/2011 | Iasillo et al. | |
| 8,104,258 B1* | 1/2012 | Jansen | F02C 7/232 137/240 |
| 2004/0236492 A1 | 11/2004 | Yasui et al. | |
| 2006/0213200 A1* | 9/2006 | Critchley | F02C 9/26 60/773 |
| 2008/0098746 A1* | 5/2008 | Iasillo | F02C 3/22 60/776 |
| 2008/0147289 A1* | 6/2008 | Feiz | F02C 7/22 701/100 |
| 2008/0154474 A1 | 6/2008 | Iasillo et al. | |
| 2009/0025396 A1* | 1/2009 | Joshi | F02C 7/22 60/773 |
| 2012/0137699 A1* | 6/2012 | Montagne | F02C 7/22 60/779 |
| 2013/0110298 A1* | 5/2013 | Beveridge | F01K 13/02 700/287 |
| 2014/0200721 A1* | 7/2014 | Rizkalla | F02C 7/228 700/282 |

OTHER PUBLICATIONS

Johnson Controls, Inc., Valve and Actuator Manual 977, Engineering Data Book, Issue Date Feb. 1994.*

Extended European Search Report and Opinion issued in connection with corresponding EP Application No. 17180135.0 dated Dec. 7, 2017.

* cited by examiner

MODEL BASED BUMP-LESS TRANSFER BETWEEN PASSIVE AND ACTIVE MODE OPERATION OF THREE-WAY CHECK VALVE FOR LIQUID FUEL DELIVERY IN GAS TURBINE SYSTEMS

BACKGROUND OF THE INVENTION

The present invention relates generally to fuel delivery systems for gas turbine engines and more specifically to an inverse fuel model and method for implementing liquid fuel flow control in a gas turbine to achieve a nearly bump-less driven watts (dwatt) power output during fuel mode transitions between passive and active modes of operation of a three-way check valve which delivers liquid fuel to the turbine combustor.

A gas turbine engine includes a compressor, combustor and turbine. Compressed air is delivered by the compressor to the combustor in which fuel is mixed with the air and combusted. Hot combustion gases turn the turbine that drives the compressor and generates work from the gas turbine engine. The combustor is formed of combustion cans typically arranged in an annular array between the compressor and turbine. Fuel to the combustor flows through pipes and valves that meter the fuel to the combustion cans. The valves are used to control fuel flow and to ensure that fuel flows equally to each of the combustion cans.

Industrial gas turbines are often capable of alternatively running on liquid and gaseous fuels, e.g., natural gas. These gas turbines have fuel supply systems for both liquid and gas fuels. The gas turbines generally do not burn both gas and liquid fuels at the same time. Rather, when the gas turbine burns liquid fuel, the gas fuel supply is turned off. Similarly, when the gas turbine burns gaseous fuel, the liquid fuel supply is turned off. Fuel transfers occur during the operation of the gas turbine as the fuel supply is switched from liquid fuel to gaseous fuel, and vice versa.

Gas turbines that burn both liquid and gaseous fuel require a liquid fuel purge system to clear the fuel nozzles in the combustors of liquid fuel. The liquid fuel supply system is generally turned off when a gas turbine operates on gaseous fuel. When the liquid fuel system is turned off, the purge system operates to flush out any remaining liquid fuel from the nozzles of the combustor and provide continuous cooling airflow to the nozzles.

FIG. 1 is a simplified schematic diagram of an exemplary gas turbine having liquid and gas fuel systems. FIG. 1 shows schematically a gas turbine power generation system 100 having liquid fuel system 102 and a liquid fuel purge system 104. The gas turbine is also capable of running on a gas, such as natural gas, and includes a gaseous fuel system 106. Other major components of the gas turbine include a main compressor 108, a combustor 110, a turbine 112 and a system controller 114. The power output of the gas turbine 112 is a rotating turbine shaft 116, which may be coupled to a generator 130 that produces electric power.

In the exemplary industrial gas turbine shown, the combustor may be an annular array of combustion chambers, i.e., combustion cans 118, each of which has a liquid fuel nozzle 120 and a gas fuel nozzle 122. The combustor may alternatively be an annular chamber. Combustion is initiated within the combustion cans at points slightly downstream of the nozzles. Air from the compressor 108 flows around and through the combustion cans 118 to provide oxygen for combustion. Moreover, water injection nozzles 124 are arranged within the combustor 110 to add excess mass flow to the hot combustion gases and to cool the combustion cans 118. The air for the liquid fuel system purge may be provided from the compressor 108, boosted by a purge air compressor (not shown) and controlled by other elements of the system (not shown). When the gas turbine power generation system 100 operates on natural gas (or other gaseous fuel), the liquid fuel purge system 104 blows compressed air into the combustion cans 118 through the liquid fuel nozzles 120 of the liquid fuel 102 system to purge liquid fuel and provide a flow of continuous cooling air to the liquid fuel nozzles 120.

FIG. 2 is a simplified diagram of a gas turbine engine with an existing liquid fuel system. Liquid fuel is provided to the liquid fuel system 200 from a liquid fuel source 205. The liquid fuel system 200 includes a flow path to a flow divider 230 through a low pressure filter 210, a fuel pump 215, a bypass control valve 220, and a stop valve 225. Pressure relief valve 235, bypass control valve 220 and stop valve 225 serve to recirculate liquid fuel to the upstream side of the low pressure filter 210 and regulate flow to flow divider 230 and fuel delivery to three-way check valve(s) 245. The flow divider 230 divides liquid fuel flow into a plurality of liquid fuel flow paths leading to one or more three-way check valve(s) 245 which feed fuel to individual combustion cans 270 of the turbine.

The turbine system controller 114 provides control signals to the fuel pump and each of the various valves to regulate and control fuel flow that is provided to the combustors in response to a fuel reference demand for a given power output. Conventionally, the controller 114 may include, among other things, an output control signal for initiating a predetermined liquid fuel prefill flow rate through the liquid fuel system, an output control signal for controlling transitions of a fuel delivery three-way valve 245 between purge air delivery and liquid fuel operation, and an output control signal for controlling a fuel bypass control valve 220 for regulating fuel flow to a fuel flow divider 230 and a turbine combustor can. The controller 114 may also accept input signals from various turbine system sensors and incorporate a hardware processor for implementing an algorithm to generate appropriate control signals based on sensor inputs and measured system parameters such as a Driven Megawatts power output.

Each liquid fuel flow path downstream of the flow divider includes a combustor fuel delivery three-way check (end-cover) valve 245 (three-way valve) and a distribution valve 260 before entering a combustor combustion can 270. Three-way valve 245 permits flow to the combustion can nozzles from the liquid fuel flow path (described above) or air flow from a liquid fuel purge air system 280. Three-way valve 245 is designed to selectably allow fuel flow to the combustor nozzles 120 from a liquid fuel supply system while preventing backflow of fuel into the liquid fuel purge air system or to allow purge air to the combustor nozzles 120 while preventing backflow of purge air into the liquid fuel system upstream of the three-way valve. By preventing purge air from entering the liquid fuel system, the air-fuel interfaces with the fuel supply are minimized.

When gas (gaseous) fuel is supplying the turbine, the three-way valve 245 is positioned to block liquid fuel flow and allow purge air to pass for cooling the fuel nozzles in the combustor. This purge must be shut off when liquid fuel is turned on.

The three-way valve 245 has passive and active operational modes. During the active mode, three-way valve 245 is controlled by external forces, such as a "Pilot" (instrument) air pressure applied by the turbine system controller 114. In passive mode, the three-way valve is controlled by the pressure of the liquid fuel. The passive mode is used to switch the three-way valve between purge air flow and purge liquid fuel flow. The active mode is applied to hold the three-way valve in a liquid fuel ON flow setting during high fuel-flow conditions. The active mode is not used to switch the three-way valve from fuel flow to purge air, or vice versa. Three-way valve 245 is biased to purge air flow, if there is insufficient fuel pressure present to operate the valve. The three-way valve 245 (operating in the passive mode) automatically switches to pass fuel to the combustor fuel nozzles when the fuel pressure increases. The increase in fuel pressure itself is the actuating force that switches the three-way valve from applying purge air to applying liquid fuel flow to the combustor.

BRIEF DESCRIPTION AND SUMMARY OF THE INVENTION

Conventionally, a three-way valve used to deliver liquid fuel to the combustor of a liquid/gas fuel turbine engine is transferred (transitioned) from a "passive mode" operation to "active mode" operation at a predetermined load point during startup and from active mode to passive mode during shutdown of turbine operation. During this transition, a fuel spike and an oscillation is often observed in the generated driven watts power output (dwatt). Such fuel spikes and/or power output oscillations, in addition to being undesirable in the delivered output power, are indicative of a turbine operating condition which is potentially detrimental to turbine components. Accordingly, there is a need and desire to eliminate such fuel spikes and dwatt power output oscillations that occur during the transitions between the passive and active operational modes of the three-way valve fuel delivery operation in a liquid/gas fuel turbine.

The description of embodiments disclosed herein generally relate to a fuel delivery flow control method and, more particularly, to an "inverse" fuel flow model used for controlling the liquid fuel delivery flow to a combustor in a gas turbine power generation system so as to achieve a "bumpless" driven watts (dwatt) power output during fuel mode transfers/transitions between passive mode and active mode operation of the three-way valve(s) used for delivering fuel to turbine combustor nozzles. An "inverse" three-way valve fuel flow model is developed based on a valve position surrogate for the three-way valve and pressure difference in fuel across the three-way valve that occurs during transitioning of the three-way valve between operational modes. A fuel flow spike estimation which is developed from inverse valve model is then used to produce valve spool position control signals for controlling a liquid fuel supply system bypass valve during the mode transitions. The valve spool position setting of the bypass valve effectively determines how much liquid fuel is recirculated back to a fuel supply source and how much and at what rate liquid fuel is provided to the combustor fuel delivery three-way valve. The model-based control signals are provided to the bypass valve in a preemptive "feed-forward" manner during the three-way valve mode transfer. This "feed forward" approach to controlling the bypass valve effectively anticipates and prevents or at least significantly reduces fuel spikes and the resultant dwatt power output spike or oscillation that occurs as a result of an operating mode transfer.

In a non-limiting exemplary implementation, an inverse valve model equation is used as an operation model for a spring-loaded three-way valve that delivers fuel to the turbine combustor. A fuel flow/dwatt power output spike estimation is made based on the inverse valve model and used to provide a feed-forward fuel flow control signal, which is utilized to control the operation of a fuel flow bypass valve in the gas turbine fuel flow supply system. For example, a valve modeling equation is first determined (using conventional valve modeling technique) which estimates the operation of at least one of the three-way valves in the fuel lines providing liquid fuel to the combustor cans of the gas turbine engine. Based on this estimated valve position, an estimate of a possible spike in fuel flow, and consequentially in dwatt output, that can occur during transfer of the three-way valve between operational modes is obtained. Then, an "inverse" three-way valve model is developed as an inverse of the valve modeling equation for the three-way valve. Based upon a measurement of the differential pressure across the three-way valve, this inverse valve model then functions as a position surrogate to provide an estimate of the three-way valve (spool) position to at least a certain predetermined degree of accuracy. A fuel spike estimate produced by the inverse valve model is then used as a feed-forward bias to manage a fuel flow control loop set point for operating bypass valve 220.

A tuning algorithm for the three-way valve inverse model may also be initially run to calibrate the valve model at the time of startup (or commissioning) of the turbine using appropriate design data available from the valve manufacturer/vendor for the particular three-way valve(s) used in the turbine.

Although the embodiments described herein provide an example of use in a gas turbine power generation system, it is also contemplated that the method and principles described herein are applicable to use in any system dependent upon a fluid flow process (e.g., power plant or any other chemical industry process) where there may occur a sudden change in fluid flow resistance (e.g., due to a sudden opening or closing of either controlled or uncontrolled components like valves or other variable area devices) which cause undesired oscillations/variations in the process parameters like flow, pressure, temperature, concentration of species etc. Using the methodology disclosed herein, the undesired variations can be predicted and a feed forward controller mechanism may be used to reduce or avoid the undesired oscillations/variations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The turbine system controller 114 may include a computer processor or comparable circuitry (not explicitly depicted) for executing software and/or other programmed instructions for performing calculations and implementing an inverse three-way valve model. The controller 114 also including appropriate conventional hardware/software for performing and operating as a bypass valve controller for providing feed-forward control signals to create a set-point and control the operating position (valve spool position) of the fuel bypass valve 220.

Figure 3:
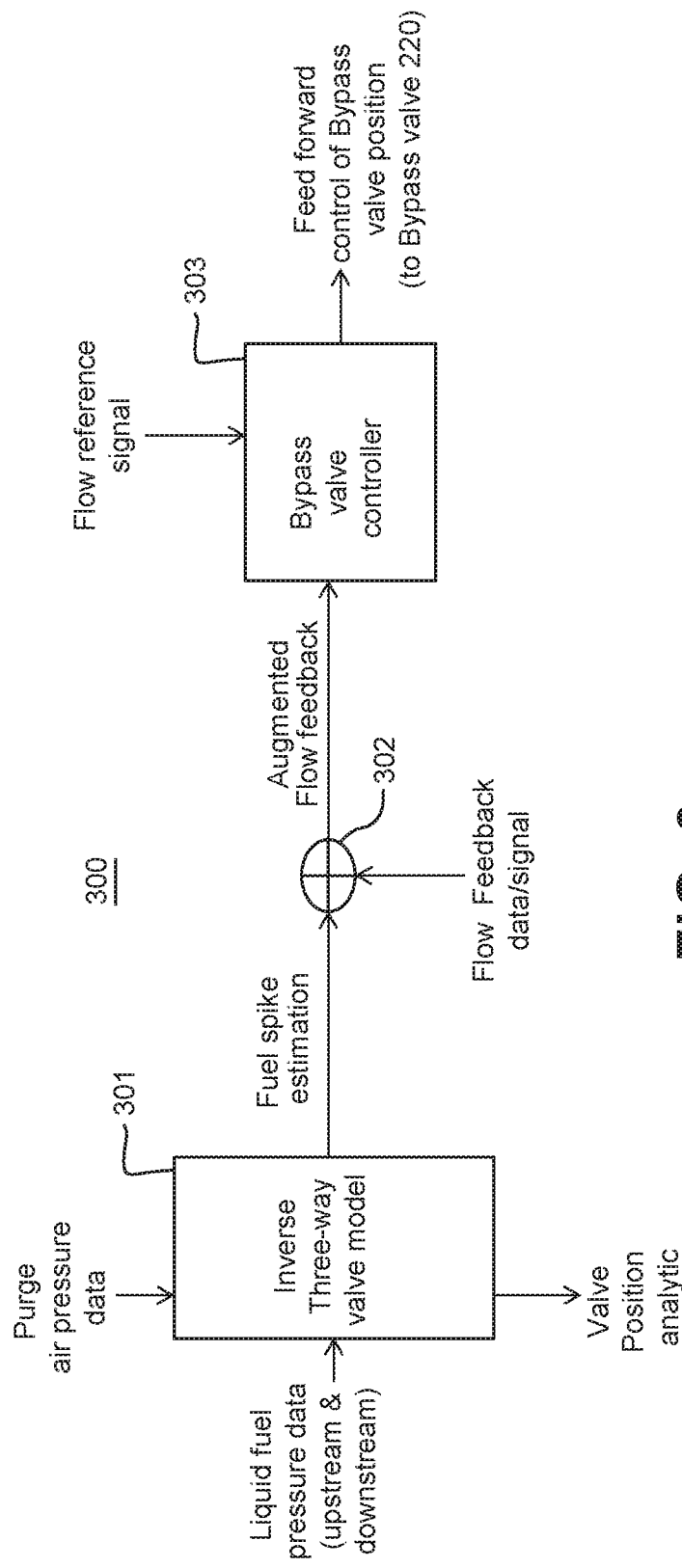
FIG. 3 is a signal flow functional diagram of input and output data signals of the inverse three-way valve model and fuel bypass valve controller implemented by the turbine system controller to provide feed-forward control of the bypass valve position.

FIG. 3 illustrates example signal flow paths 300 of input and output data signals for the inverse three-way valve model 301 and fuel bypass valve controller 303 implemented by the turbine system controller 114 to provide a feed-forward control of the bypass valve.

Figure 1:
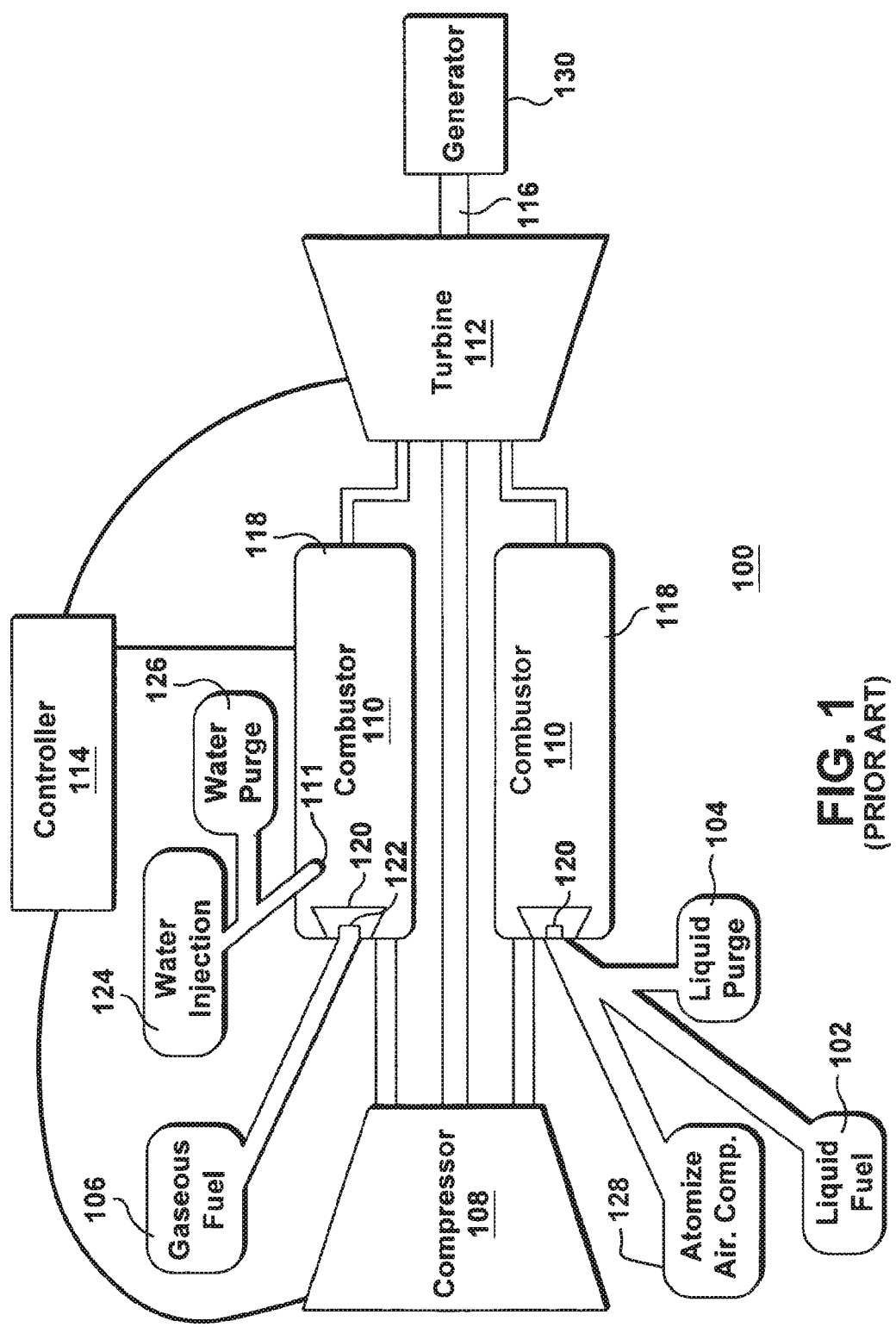
FIG. 1 is a simplified schematic diagram of an exemplary gas turbine having liquid and gas fuel systems.

As an example embodiment, the three-way valve model 301 is implemented as software configured to be executed by a computer processor (not shown in FIG. 1) of the turbine controller 114 which accepts input data or signals indicative of specifically monitored turbine system operating parameters and conditions including the existing purge air pressure and the liquid fuel pressure measured both upstream and downstream of fuel delivery three-way valve 245. Such input signals may be obtained, for example, from sensors located at or within appropriate components and positions within turbine system 100. Based on the liquid fuel pressure data and the purge air pressure data inputs, the three-way valve model 301 (described in greater detail below with reference to FIG. 4) provides a fuel flow spike estimation output and may also be used to provide valve position analytic data specific to a three-way valve 245. The fuel spike estimation is used to augment a fuel flow rate feedback signal/data 302 obtained from three-way valve 245 to produce augmented flow feedback signal/data. This augmented flow feedback signal/data is provided to a Bypass Valve Controller 303, which may be a part of turbine control system 114. The Bypass Valve Controller 303 then generates the feed-forward control signal for modulating the valve operating position of fuel bypass valve 220 based on a fuel flow reference data/signal and the augmented flow feedback signal/data to produce signals for controlling the position of bypass valve 220 in the turbine liquid fuel supply system.

Figure 4:
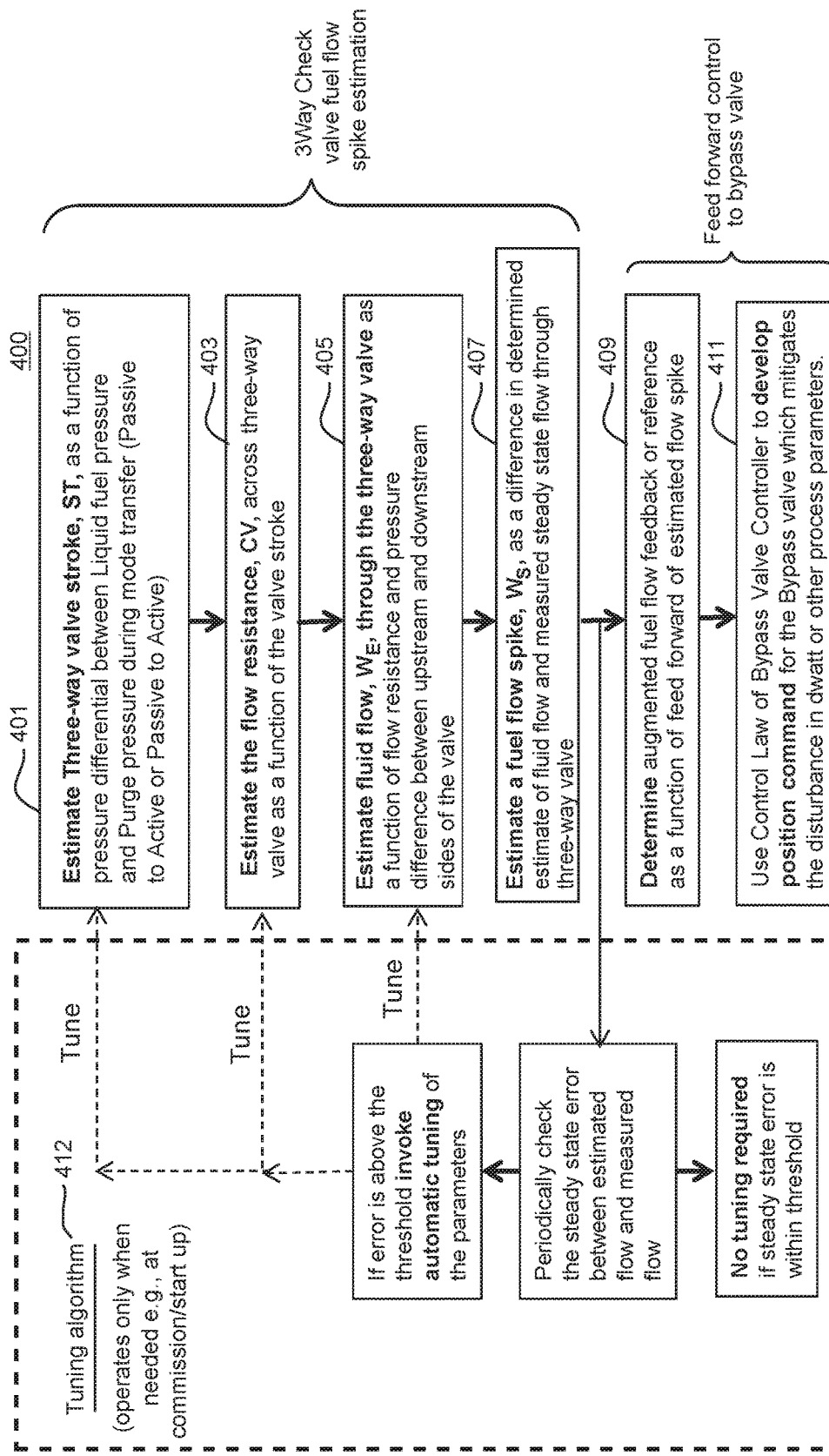
FIG. 4 is a process flow chart for implementing the inverse three-way valve model and generating the feed-forward signal for controlling the fuel bypass valve position.

FIG. 4 illustrates an example process flow chart 400 for implementing the inverse three-way valve model 301 and generating the feed-forward signal for controlling and modulating the fuel bypass valve 220 operating position. Initially, in block 401, an estimate of the valve stroke, ST, of at least one of the turbine combustor fuel delivery three-way valves 245 is determined as a function of a measured pressure differential between a purge air pressure for the valve and a liquid fuel pressure that initiates a mode transfer process (i.e., a transition from passive mode operation of the valve to active mode operation or vice versa). An estimate of the fluid flow resistance, CV, across three-way valve 245 is then determined, at block 403, as a function of the valve stroke estimate. Next, as shown at block 405, an estimate of the fluid fuel flow, $W_E$, through three-way valve 245 is determined as a function of the estimated fluid flow resistance and a measured pressure difference existing between upstream and downstream sides of the three-way valve. Then, as indicated in block 407, a fuel flow spike estimate, $W_s$, of the fuel flow spike that is likely to occur as a result of the transfer of the valve between modes is determined as being a function of the difference in the determined estimate of fluid flow and a known or predetermined measured steady state flow value for the three-way valve. Based on the determined estimated fuel flow spike, inverse three-way valve model 301 provides an inverse of that estimated fuel flow spike as an output.

At this stage, the inverse fuel flow spike estimation produced by valve model 301 is augment a fuel flow feedback signal provided to Bypass Valve Controller 303. Conventionally, a valve controller such as is configured to calculate an error value between a desired set point for the valve and a measured process variable. This measured process variable is provided as feedback signal input to the controller and the controller attempts to minimize the error over time by adjustment of a control variable for the process according to a predetermined mathematical control law. In this case, for example, Bypass Valve Controller 303 is provided with a fuel flow feedback signal from three-way check valve 245 that is augmented by the inverse fuel flow spike estimation and which is then used by the controller to adjust the position of the bypass valve 220 according to a predetermined conventional control law.

As indicated at block 409 of FIG. 4, an augmented fuel flow rate feedback is produced as a function of both the fuel spike estimation and the current fuel flow rate feedback data/signal obtained at three-way valve 245. Next, as indicated at block 411, a predetermined control law is used by Bypass Valve Controller 303 to calculate a position command in response to the augmented fuel flow rate feedback data and a current fuel flow rate reference signal. This position command is sent to the fuel supply system bypass valve 220 and sets or modulates the current operating position (spool position) of the bypass valve to affect the fuel rate/amount provided to three-way valve 245. Since the bypass valve 220 position command produced by Bypass Valve Controller 303 is developed based upon an inverse of a three-way valve operational model for three-way valve 245, it can effectively counteract or at least mitigate a fuel flow spike and the disturbances that are likely to occur in the dwatt power output (or other relevant monitored system parameters) during the three-way valve's transference between operational modes.

As illustrated at the left side portion of FIG. 4, a valve model tuning algorithm 412 may be used initially or whenever needed to calibrate three-way valve inverse model 301 (e.g., at time of startup or commissioning of the turbine). The tuning algorithm 412 is configured to periodically check the steady state error between the calculated fuel flow estimate and the measured fuel flow through three-way valve 245. No tuning of the model is required or performed if the steady state error is found to be within a predetermined threshold (that threshold being based, for example, on specifications and operational parameter data obtainable from a valve manufacturer/vendor of the particular three-way valve(s) used in the turbine). If the error is above the threshold, then slight tuning (e.g., incremental changes) of various model parameter values, such as the estimated valve stroke and/or the estimated flow resistance and/or the estimated fluid flow through the valve, is performed by tuning algorithm 412.

Figure 5:
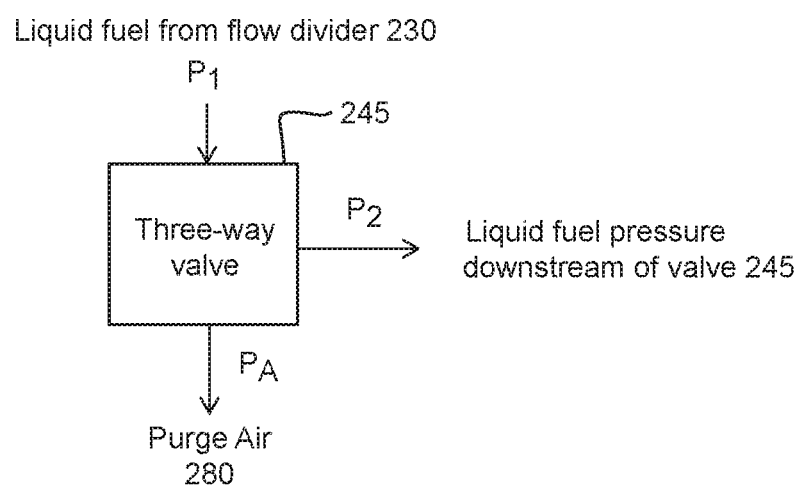
FIG. 5 is a diagram of liquid fuel and purge air pressures at the fuel delivery three-way valve.

FIG. 5 illustrates example liquid fluid and purge air pressures measured at the three-way valve which are indicated in the FIG. 4 process flow for implementing the inverse three-way valve model 301. $P_1$ represents the pressure of the liquid fuel from flow divider 230 at three-way valve 245, $P_2$ represents the pressure of the liquid fuel just down-stream of three-way valve 245 and $P_A$ represents the pressure of purge air at three-way valve 245. At block 401 of FIG. 4, the three-way valve stroke, ST, may be calculated, for example, in accordance with Equation 1 below:

$$ST = \frac{P_1 - P_A - P_{Lift}}{P_{max} - P_{Lift}}$$

Equ. 1 where $P_{max}$ and $P_{Lift}$ are conventional operational pressure parameters for the three-way valve which are typically specified by the valve manufacturer.

At block 403 of FIG. 4, a flow resistance, CV, across three-way valve 245 may be calculated, for example, in accordance with Equation 2 below:

$$CV = f(ST)$$

Equ. 2 where CV is typically specified as a function of valve stroke ST by the manufacturer of the three-way valve.

At block 405 of FIG. 4, an estimate of fluid flow, $W_E$, through three-way valve 245 may be calculated, for example, in accordance with Equation 3 below:

$$W_E = CV \cdot \mathrm{SQRT}(P_1 - P_2)$$

Equ. 3

At block 407 of FIG. 4, the estimated spike, $W_S$, in fluid flow may be calculated, for example, in accordance with Equation 4 below:

$$W_S = W_E - W_{measured}$$

Figure 2:
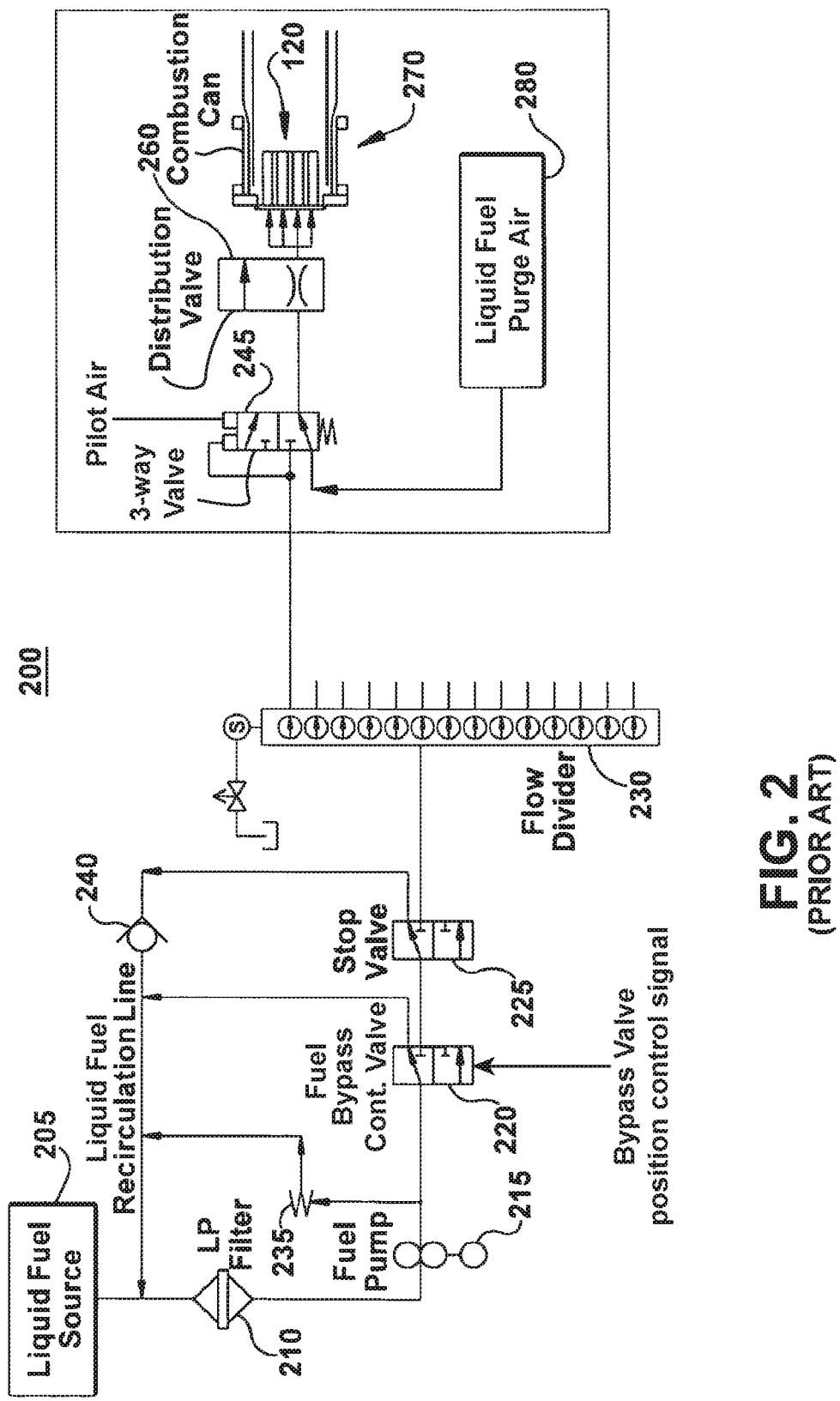
FIG. 2 is a simplified diagram of a gas turbine engine with an existing liquid fuel system.

Equ. 4 where $W_{measured}$ is fluid flow measured just upstream of the three-way valve (for example, after flow divider 230 in the system of FIG. 2).

Finally, at blocks 409-411 of FIG. 4, a position command for providing feed-forward control of a bypass valve in the fluid flow system (for example, a new position command for fuel bypass valve 220 in the FIG. 2 system) may be determined as a function of the estimated spike, $W_S$, and various gain control values used for the bypass valve controller 303, as indicated by Equation 5 below:

$$\text{Bypass Valve Position} = f(W_s, KP, KI)$$

Equ. 5 where $W_S$ is the calculated estimated spike, and KP and KI are user settable Proportional and Integral gain control values for the bypass valve controller.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling liquid fuel flow to one or more three-way check valves used for delivering fuel to a turbine combustor in a turbine power generation system during transfers between passive and active modes of check valve operation, the turbine power generation system including a combustor fuel delivery three-way check valve and a bypass valve, the method comprising:
    producing a fuel flow spike signal based on an inverse operational model of the three-way check valve, the fuel flow spike signal indicative of an inverse of a fuel flow spike occurring during mode transfers of a fuel delivery three-way check valve between passive and active modes;
    wherein the inverse operational model is developed by:
        calculating a stroke of a three-way check valve delivering fuel to a combustor as a function of a measured pressure differential between a purge air pressure for the valve and a liquid fuel pressure that initiates a mode transfer process;
        calculating a fluid flow resistance across the three-way check valve as a function of the calculated stroke of the three-way check valve;
        calculating a fluid flow through the three-way check valve as a function of the calculated fluid flow resistance and a measured pressure difference existing between upstream and downstream sides of the three-way check valve;
        calculating a fuel flow spike likely to occur as a result of the transfer of the valve between modes as a function of a difference in the calculated fluid flow and a known steady state flow for the three-way check valve; and
        determining an inverse of the calculated fuel flow spike;
    generating a bypass valve position command based on the fuel flow spike signal; and
    providing the bypass valve position command to the bypass valve during transfers between passive and active modes of the three-way check valve operation in a feed-forward control manner that counteracts or mitigates a fuel flow spike associated with such mode transfers.

2. The method of claim 1 wherein the inverse operational model utilizes input data indicative of liquid fuel pressures existing upstream and downstream of the three-way check valve.

3. The method of claim 1 wherein the inverse operational model utilizes input data indicative of purge air pressure at the three-way check valve.

4. The method of claim 1 wherein the inverse operational model produces analytic output data indicative of a valve position for the three-way check valve.

5. The method of claim 1 wherein the bypass valve position command is developed from a fuel flow feedback signal indicative of liquid fuel flow through the three-way valve augmented by the fuel flow spike signal.

6. The method of claim 1 wherein the bypass valve position command is developed based on a fuel flow reference signal and a fuel flow feedback signal augmented by the fuel flow spike signal.

7. The method of claim 1 wherein the generating of the bypass valve position command includes determining an augmented fuel flow feedback signal as a function of the fuel flow spike signal.

8. The method of claim 1 wherein the inverse operational model further includes a model tuning algorithm configured to periodically check steady state error between a calculated fuel flow for the three-way check valve and a measured fuel flow through the three-way check valve, and make incremental changes to a calculated valve stroke value and/or a calculated flow resistance value and/or a value indicative of a calculated fluid flow through the three-way check valve.

9. A turbine power generation control system for controlling liquid fuel flow to a fuel delivery three-way check valve used for providing liquid fuel to a turbine combustor, comprising:
    a fuel delivery three-way check valve;
    a fuel bypass valve; and
    a turbine system controller, the turbine system controller including a hardware processor configured to operate as an inverse operational model of the three-way check valve and to produce a fuel flow spike signal indicative of an inverse of a fuel flow spike which occurs during mode transitions of the three-way check valve between passive and active operational modes; and a bypass valve controller, the bypass valve controller generating a bypass valve position command based on the fuel flow spike signal and providing the bypass valve position command to the fuel bypass valve during transfers of the three-way check valve operation between passive and active modes, wherein fuel flow spikes and output power oscillations resulting from transitions between operational modes for the three-way check valve operation are mitigated;

wherein the processor is configured to implement the inverse operational model by performing operations comprising:

calculating a stroke of the three-way check valve delivering fuel to a combustor as a function of a measured pressure differential between a purge air pressure for the valve and a liquid fuel pressure that initiates a mode transfer process;

calculating a fluid flow resistance across the three-way check valve as a function of the valve stroke of the three-way check valve;

calculating a fluid flow through the three-way check valve as a function of the calculated fluid flow resistance and a measured pressure difference existing between upstream and downstream sides of the three-way check valve;

calculating a fuel flow spike likely to occur as a result of the transfer of the valve between modes as a function of a difference in the calculated fluid flow and a known steady state flow for the three-way check valve; and determining an inverse of the calculated fuel flow spike.

10. The system of claim 9 wherein the processor produces analytic output data indicative of a valve position for the three-way check valve based on the inverse operational model.

11. The system of claim 9 further comprising a signal augmenter which augments a fuel flow feedback signal indicative of liquid fuel flow through the three-way check valve with the fuel flow spike estimation signal.

12. The system of claim 9 wherein the bypass valve controller generates the valve position command based on a fuel flow feedback signal indicative of liquid fuel flow through the three-way check valve augmented by the fuel flow spike signal.

13. The system of claim 12 wherein the bypass valve position command is developed from a fuel flow feedback signal augmented by the fuel flow spike.

14. The system of claim 12 wherein the bypass valve position command is developed based on a fuel flow reference signal and a fuel flow feedback signal augmented by the fuel flow spike signal.

* * * * *